(12) United States Patent
Yeh et al.

(10) Patent No.: US 12,592,788 B2
(45) Date of Patent: Mar. 31, 2026

(54) WAKE-UP RADIO HAVING SINGLE BIT CORRELATORS

(71) Applicant: Silicon Laboratories Inc., Austin, TX (US)

(72) Inventors: Yi Shen Yeh, Austin, TX (US); Yan Zhou, Austin, TX (US); Marc Leroux, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 347 days.

(21) Appl. No.: 18/175,606

(22) Filed: Feb. 28, 2023

(65) Prior Publication Data

US 2024/0291581 A1      Aug. 29, 2024

(51) Int. Cl.
*H04J 3/06*          (2006.01)
*H04W 52/02*       (2009.01)

(52) U.S. Cl.
CPC ....... *H04J 3/0658* (2013.01); *H04W 52/0229* (2013.01)

(58) Field of Classification Search
CPC .. H04J 3/0658; H04W 52/0229; H04B 1/709; H04L 7/042; Y02D 30/70
See application file for complete search history.

(56) References Cited

U.S. PATENT DOCUMENTS

| | | | | |
|---|---|---|---|---|
| 8,995,586 B2 * | 3/2015 | Ly-Gagnon | ....... | H04W 52/0229 |
| | | | | 375/343 |
| 2017/0230889 A1 * | 8/2017 | Zheng | ................. | H04W 40/005 |

| | | | | |
|---|---|---|---|---|
| 2018/0103431 A1 | 4/2018 | Suh et al. | | |
| 2018/0152333 A1 | 5/2018 | Shellhammer et al. | | |
| 2019/0028968 A1 | 1/2019 | Ma et al. | | |
| 2019/0082385 A1 | 3/2019 | Shellhammer et al. | | |
| 2019/0116555 A1 | 4/2019 | Kristem et al. | | |
| 2020/0137686 A1 | 4/2020 | Cao et al. | | |
| 2020/0235966 A1 * | 7/2020 | Wang | ................... | H04B 17/318 |

(Continued)

FOREIGN PATENT DOCUMENTS

| | | | | | |
|---|---|---|---|---|---|
| EP | 0886386 A2 * | 12/1998 | ........... | H04B 1/7093 |
| KR | 20160026238 A * | 3/2016 | ............. | H04L 7/042 |

(Continued)

OTHER PUBLICATIONS

Po-Han Peter Wang, A Dual-Mode Wi-Fi/BLE Wake-Up Receiver, IEEE Journal of Solid-State Circuits, vol. 56, No. 4, Apr. 2021, pp. 1288-1298.

(Continued)

*Primary Examiner* — Sujoy K Kundu
*Assistant Examiner* — Samuel Dilan Rutnam
(74) *Attorney, Agent, or Firm* — Trop, Pruner & Hu, P.C.

(57) ABSTRACT

In one implementation, a method comprises: receiving, in a first radio, a radio frequency (RF) signal and processing the RF signal to provide a bit stream to a digital circuit of the first radio; enabling a first correlator of the first radio to detect at least a first portion of a sync word of a wake-up packet of the bit stream, and thereafter enabling a second correlator of the first radio to detect at least a second portion of the sync word; enabling an averager circuit to detect another portion of the sync word; and in response to detection of the sync word, disabling the first and second correlators and maintaining the averager circuit enabled.

20 Claims, 12 Drawing Sheets

400

(56)                    References Cited

U.S. PATENT DOCUMENTS

| | | | |
|---|---|---|---|
| 2021/0075452 A1* | 3/2021 | Huang | H04L 27/06 |
| 2024/0023038 A1* | 1/2024 | Nowshadi | H04W 56/001 |
| 2024/0163144 A1 | 5/2024 | Oved et al. | |
| 2025/0113302 A1 | 4/2025 | He | |
| 2025/0142474 A1 | 5/2025 | Cheng et al. | |
| 2025/0175899 A1 | 5/2025 | Li et al. | |

FOREIGN PATENT DOCUMENTS

| | | | | |
|---|---|---|---|---|
| WO | WO-0124415 A1 * | 4/2001 | | H04B 17/20 |
| WO | 2020004825 A1 | 1/2020 | | |
| WO | 2020017929 A1 | 1/2020 | | |
| WO | 2021004697 A1 | 1/2021 | | |

OTHER PUBLICATIONS

United States Patent Office, Non-Final Office Action dated Jun. 4, 2025 in U.S. Appl. No. 18/175,623 (15 pages).
United States Patent Office, Final Office Action dated Dec. 22, 2025 in U.S. Appl. No. 18/175,623 22 pages).
United States Patent Office, Reply to Office Action filed Sep. 3, 2025 in U.S. Appl. No. 18/175,623 (9 pages).

* cited by examiner

200

| 201 | 202 | 203 | 204 | 205 | 206 | 207 | 208 |
|---|---|---|---|---|---|---|---|
| Preamble (1 octet) | Sync (4 Octets) | WM (0.5 Octet) | Length (0.5 Octet) | Address (2 Octets) | Token (4 Octets) | Payload (Based on WM and Length) | CRC (2 Octet) |

Tx Packet | $f_s$=40Mhz | 125Kcps | 8μs Per Chip

700

WAKE-UP RADIO HAVING SINGLE BIT CORRELATORS

BACKGROUND

Radios are incorporated into ever smaller and evolving types of devices. Current trends expand use of radios for small, low cost, low power devices including a variety of Internet of Things (IoT) devices.

Proposals to reduce power consumption include providing a radio having lower power consumption that can be used for purposes of triggering a wake-up of a larger radio. However, the complexity involved in this radio can still cause unwanted power consumption.

SUMMARY OF THE INVENTION

In one aspect, an apparatus includes: an analog front end circuit to receive a radio frequency (RF) signal and to output a bit stream; and a digital circuit coupled to the analog front end circuit. The digital circuit may include: a first correlator to receive at least a first portion of the bit stream and perform a correlation on the first portion to generate a first correlation result; a second correlator to receive at least a second portion of the bit stream and perform a correlation on the second portion to generate a second correlation result; and a controller coupled to the first correlator and the second correlator. The controller may be configured to enable the second correlator when the first correlation result exceeds a first threshold.

In an implementation: the first correlator is to perform the correlation on the first portion of the bitstream comprising a first portion of a sync word of a wake-up packet; and the second correlator is to perform the correlation on the second portion of the bitstream comprising a second portion of the sync word of the wake-up packet. The apparatus may sum the first correlation result and the second correlation result and compare the sum to a second threshold.

In an implementation, the apparatus further comprises an averager, where the controller is to enable the averager in response to the sum exceeding the second threshold. The first and second correlators are to perform a sync word check on arrived bits of the bit stream, and the averager is to perform the sync word check on arriving bits of the bit stream. The analog front end circuit may be configured to receive the RF signal having Manchester encoding on off keying (MOOK) modulation. The first correlator and the second correlator may be single-bit correlators. The controller may include at least one state controller, wherein the at least one state controller is to: in response to an enable signal from a scheduler, cause the first correlator to transition from an idle state to an active state; and in response to the first correlation result exceeding the first threshold, cause the second correlator to transition from the idle state to the active state.

In an implementation, the controller comprises at least one state controller to cause: the first correlator and the second correlator to decode arrived bits of a sync word of a wake-up packet; and cause an averager to decode arriving bits of the sync word of the wake-up packet. The apparatus may comprise a scheduler to enable the controller for a scan window according to a predetermined interval, the apparatus comprising a wake-up radio. In response to detection of a valid wake-up packet in the bit stream, the wake-up radio is to send a wake-up signal to a second radio to cause the second radio to enter an active state.

In another aspect, a method comprises: receiving, in a first radio, a RF signal and processing the RF signal to provide a bit stream to a digital circuit of the first radio; enabling a first correlator of the first radio to detect at least a first portion of a sync word of a wake-up packet of the bit stream, and thereafter enabling a second correlator of the first radio to detect at least a second portion of the sync word; enabling an averager circuit to detect another portion of the sync word; and in response to detection of the sync word, disabling the first and second correlators and maintaining the averager circuit enabled.

In an implementation, the method further comprises decoding, via the averager circuit, at least a portion of the wake-up packet. The method may also include in response to decoding the wake-up packet, sending an interrupt from the first radio to a second radio to cause the second radio to be enabled, the first radio comprising a wake-up radio and the second radio comprising a primary radio.

In an implementation, the method further includes: correlating, in the first correlator, at least a first portion of the bit stream with a first predetermined value to detect the first portion of the sync word; and correlating, in the second correlator, at least a second portion of the bit stream with a second predetermined value to detect the second portion of the sync word. The method also includes detecting the first portion of the sync word when a first correlation result of the first correlator exceeds a first correlation threshold, where the first correlator comprises a single-bit correlator and the bit stream comprises a Manchester encoded on-off keying bit stream. The method further includes detecting the second portion of the sync word when a sum of a second correlation result of the second correlator and the first correlation result of the first correlator exceeds a second correlation threshold, wherein the second correlator comprises a single-bit correlator. The method may further comprise: performing, via the first and second correlators, a sync check on the first and second portions of the sync word using arrived bits of the bit stream; and performing, via the averager circuit, the sync check on the another portion of the sync word using incoming bits of the bit stream.

In yet another aspect, a system comprises a first radio to receive and process an incoming RF signal, and a second radio coupled to the first radio. The first radio includes: a digital circuit to receive a bit stream obtained from the RF signal, the digital circuit comprising: a scheduler to enable a core circuit for a scan window according to a predetermined interval; and the core circuit coupled to the scheduler. The core circuit may include: a first correlator to receive at least a first portion of the bit stream and perform a correlation on the first portion to identify a first portion of a sync word of a wake-up packet; a second correlator to receive at least a second portion of the bit stream and perform a correlation on the second portion to identify a second portion of the sync word of the wake-up packet, where the second correlator is to be enabled when the first correlation result exceeds a first threshold; and an averager circuit to decode another portion of the sync word. In response to detection of the wake-up packet, the first radio is to send a wake-up signal to the second radio.

In an implementation, the first and second correlators comprise single bit correlators, the first and second portions of the bit stream are oversampled and Manchester encoded, the RF signal comprising the Manchester encoding of random on-off keying data.

DETAILED DESCRIPTION

In various embodiments, a device is provided with multiple radios, including a main radio and a wake-up radio (WuR), which is a low power radio defined to enable devices to save power by using it to wake-up the rest of the device when required. Embodiments described herein are used in conjunction with a Bluetooth Low Energy (BLE) radio, to prevent its use when there is no activity directed at the device.

Figure 1:
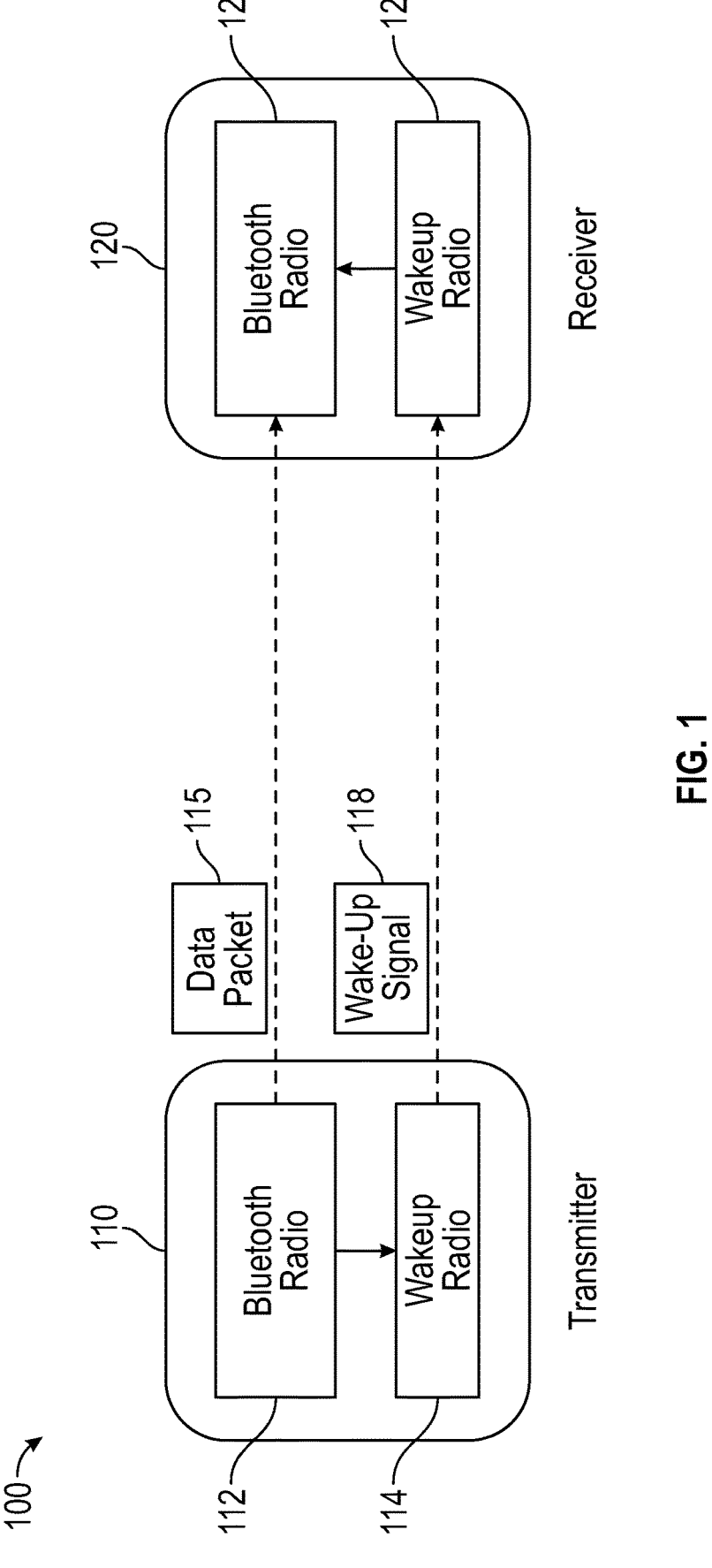
FIG. 1 is a block diagram of a wireless communication environment in accordance with an embodiment.

As such, this WuR may be designed and controlled as described herein to realize significant improvements in power consumption (e.g., a 50× improvement in power consumption (<200 μW)) with fast wake-up time (<20 ms), while maintaining a sensitivity of −89.5 dBm at a bit error rate (BER) of 0.1%, in an example. As will be described herein, these power savings may be realized by the design of the receiver and its control to tightly schedule activity of different portions of the receiver in a power conscious manner Referring now to FIG. 1, shown is a block diagram of a wireless communication environment in accordance with an embodiment. As shown in FIG. 1, a wireless communication environment 100 such as a wireless local area network (WLAN) includes various devices such as Internet of Things (IoT) devices, including a transmitter 110 and a receiver 120. Although embodiments are not limited in this regard, assume for purposes of discussion that these components communicate via at least one wireless communication protocol such as one or more Bluetooth protocols. The components also may be configured to communicate according to other wireless communication protocols, including Wi-Fi, cellular communications, e.g., 5G or beyond, and so forth. Although only two devices are shown for ease of discussion, additional devices may be present in other embodiments.

With embodiments, significant power consumption savings may be realized by causing main radio circuitry of the devices to remain in a low power mode, unless a given communication is to occur between the devices. To this end, transmitter 110 and receiver 120 may include so-called wake-up radios (WuRs). More specifically as shown, transmitter 110 includes, in addition to a Bluetooth radio 112 (which may be the main or primary Bluetooth transmitter), a WuR 114. Similarly, receiver 120 includes, in addition to a Bluetooth radio 122 (which may be the main or primary Bluetooth receiver), a WuR 124.

With this arrangement, the main radio components of the devices may be maintained in a low power mode until a communication is to occur. A transmitter starts a wake-up event to communicate with a receiver when operating in a wake-up mode. To initiate a wake-up of Bluetooth radio 122, wake-up radio 114 communicates a wake-up signal 118, to be received by wake-up radio 124. Upon successful receipt and processing of wake-up signal 118, which in an embodiment may be include a wake-up protocol data unit (PDU), wake-up radio 124 communicates a wake-up signal, an interrupt or other notification signal. This signal causes Bluetooth radio 122 to wake up, thereby enabling it to receive a data packet 115 communicated from Bluetooth radio 112.

During a wake-up event, the wake-up transmitter sends a wake-up message to a specific wake-up receiver or group of receivers using an address of one or more targets. Upon successful wake-up requests in which a response is expected, the wake-up receiver responds, e.g., with an advertising event. In an embodiment, the wake-up receiver does not respond to invalid requests. In one implementation, a wake-up event is considered as closed if the wake-up receiver has responded or a given amount of time has elapsed. The wake-up transmitter may repeat the wake-up event for one or more attempts if the receiver has not responded. If repeated attempts are not successful, the wake-up procedure can be considered as failed and the controller notifies the host. The wake-up receiver may be controlled to enter a WuR scanning state to listen for a packet sent on a wake-up channel, e.g., for a given scan window duration, after which the receiver may enter into an idle state until a next wake-up scan window.

Although shown at this high level for ease of discussion, understand that various enhancements are possible in embodiments. For example, understand that while discussed above as a "transmitter" and a "receiver," each device may be a full radio having transmit and receive capabilities.

Figures 2A, 2B, 2C:
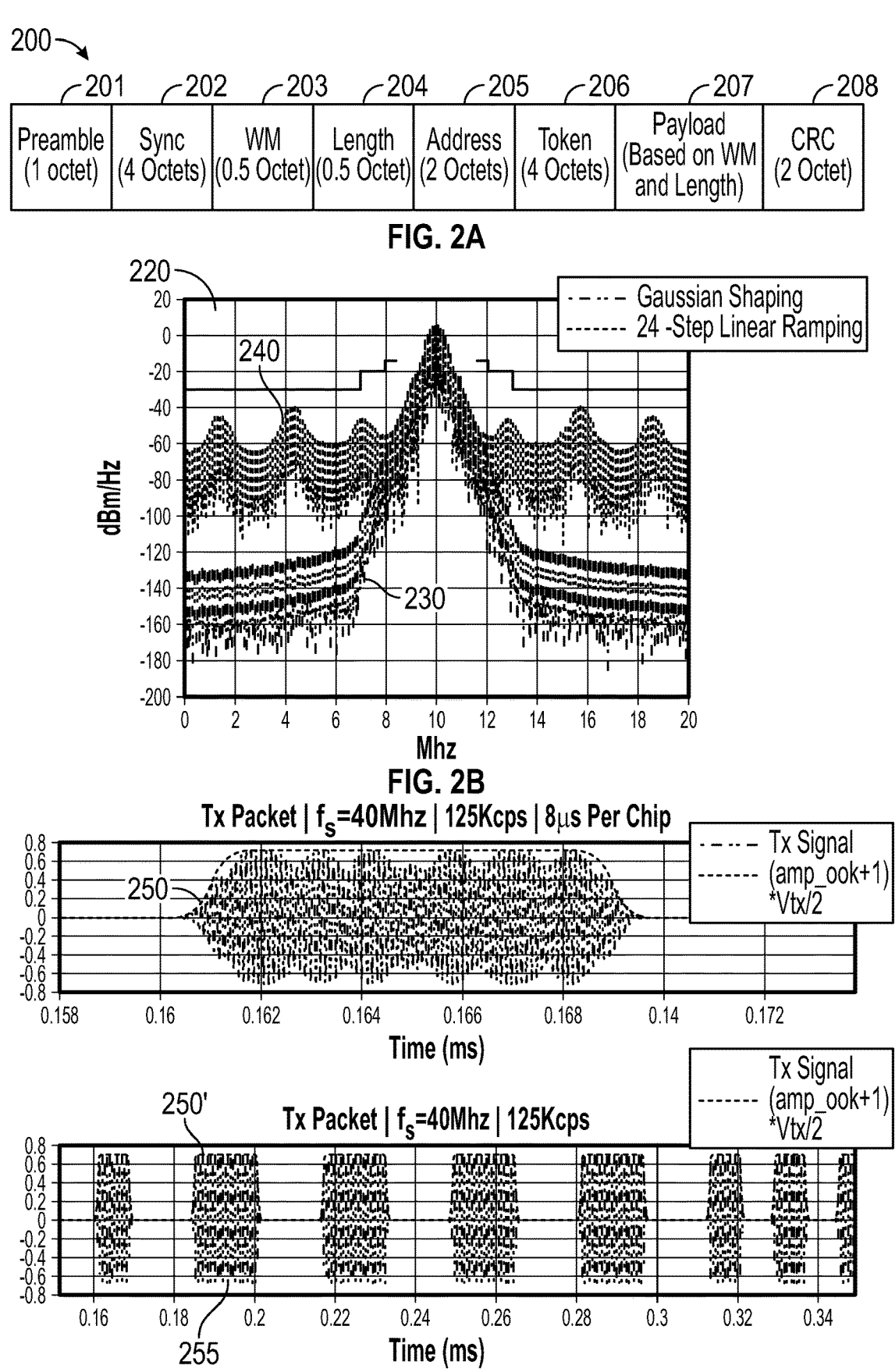
FIG. 2A is a block diagram illustrating an arrangement of a wake-up packet in accordance with an embodiment.
FIG. 2B is a transmission power spectrum of a wake-up communication in accordance with an embodiment.
FIG. 2C is a time domain plot of an MOOK-modulated wake-up packet in accordance with an embodiment.

Depending on implementation, a wake-up packet may be a fixed length or variable length packet. With reference now to FIG. 2A, shown is a block diagram illustrating an arrangement of a wake-up packet in accordance with an embodiment. As shown in FIG. 2A, wake-up packet 200 may be modulated with Manchester encoding (ME) on-off keying (MOOK). With embodiments, wake-up packet 200 may be communicated at a data rate of 125 kilobytes per second (Kbps). The MOOK information may be modulated by a Bluetooth low energy 1M Gaussian frequency shift keying (GFSK) physical unit (PHY) circuit using random data, e.g., PRBS9 data. By adding the MOOK modulation to such data, a bit rate of 62.5 Kbps may be realized, with 2-chip Manchester coding.

In a particular embodiment, a resulting 2GFSK symbol rate is 1 M-symbols per second where 8 symbols represent 1 chip and 2 chips represent 1 bit, supporting a bitrate of 62.5 kbps. The mapping of input bit to output chip sequence (in transmission order) is Manchester encoded as shown in Table 1.

TABLE 1

| Input Bit | Output Chip Sequence |
|---|---|
| 0 | 01 |
| 1 | 10 |

Although embodiments are not limited in this regard, in implementations wake-up packets may be sent on one or more particular wireless channels. For example, a channel that is used for wake-up requests may have low interference, to avoid retransmission of wake-up requests. In one embodiment, non-primary advertising LE channels that do not overlap with frequently used Wi-Fi channels (e.g., channels 1, 6 and 11) may be used and/or channels that are a multiple of 16 MHz.

With reference to FIG. 2A, a packet length of wake-up packet 200 may be between 104 and 144 bits, corresponding to a time duration of between 1.664-2.304 milliseconds (ms). As shown in FIG. 2A, wake-up packet 200 is formed of multiple fields, namely a preamble field 201 which may be 1 octet (8 bits), a sync word field 202 which may be 4 octets, a wake-up mode field 203 which may be 4 bits, a length field 204 which may be 4 bits ((to indicate a length of a payload), an address field 205 which may be 2 octets, a token field 206 which may be 4 octets, a payload field 207 which may have a length based on a given wake-up mode and length, and finally, a cyclic redundancy check (CRC) field 208 which is 2 octets.

In embodiments a WuR uses preamble and sync word fields to detect a wake-up message and acquire timing synchronization. In an embodiment, address field 205 may be 15 bits and be split into Receiver ID and a Group ID. In a particular embodiment, the Group ID is a 7-bit value and the Receiver ID is an 8-bit value.

In an embodiment, wake-up mode field 203 is 4 bits and can be defined as shown in Table 2 below.

TABLE 2

| Value | Details |
|---|---|
| 0000 | Wake up device or devices which are targeted using the Target Address. This mode has no payload and length is 0. This mode requires a Response. |
| 0001 | The targeted device accepts timing sync to reset a local RTC. This mode has no payload and length is 0. This mode does not initiate a Response. |
| 0010 | The targeted device accepts the timing sync to reset the local RTC and also wakes up the device. This mode has no payload and length is 0. This mode requires a Response. |
| 0011 to 1111 | Reserved for future use |

Token field 206 may be used to identify the wake-up transmitter. A WuR may support multiple stored tokens (e.g., a single token for each supported transmitter). Although embodiments are not limited in this regard, example payloads may be used to provide commands, such as commands to toggle LED states and switch images on a device (e.g., a previously transmitted image). In turn, CRC field 208 may be a CRC value that is computed over the WM, Length, Address, Token, and Payload fields. Of course while shown with this particular arrangement of a wake-up packet, variations are possible in other implementations.

Referring now to FIG. 2B, shown is a transmission power spectrum of a wake-up communication in accordance with an embodiment. As shown in FIG. 2B, power spectrum 220 includes a Bluetooth low energy (BLE) transmission 230 that is sent using GFSK modulation, namely a BLE-modulated signal containing random data. On top of this a MOOK-modulated transmission 240 is sent that may form at least part of a wake-up packet in accordance with an embodiment.

Referring now to FIG. 2C, shown is a time domain plot of an MOOK-modulated wake-up packet in accordance with an embodiment. As shown in FIG. 2C, wake-up packet 250 is illustrated in a baseline figure and in an inset 250' that zooms in on a portion of wake-up packet 250. As illustrated, the amplitude of an underlying BLE packet is MOOK-modulated and a dense portion (as shown in inset 250', e.g., at reference 255) includes the original BLE-modulated data.

Figures 3A, 3B:
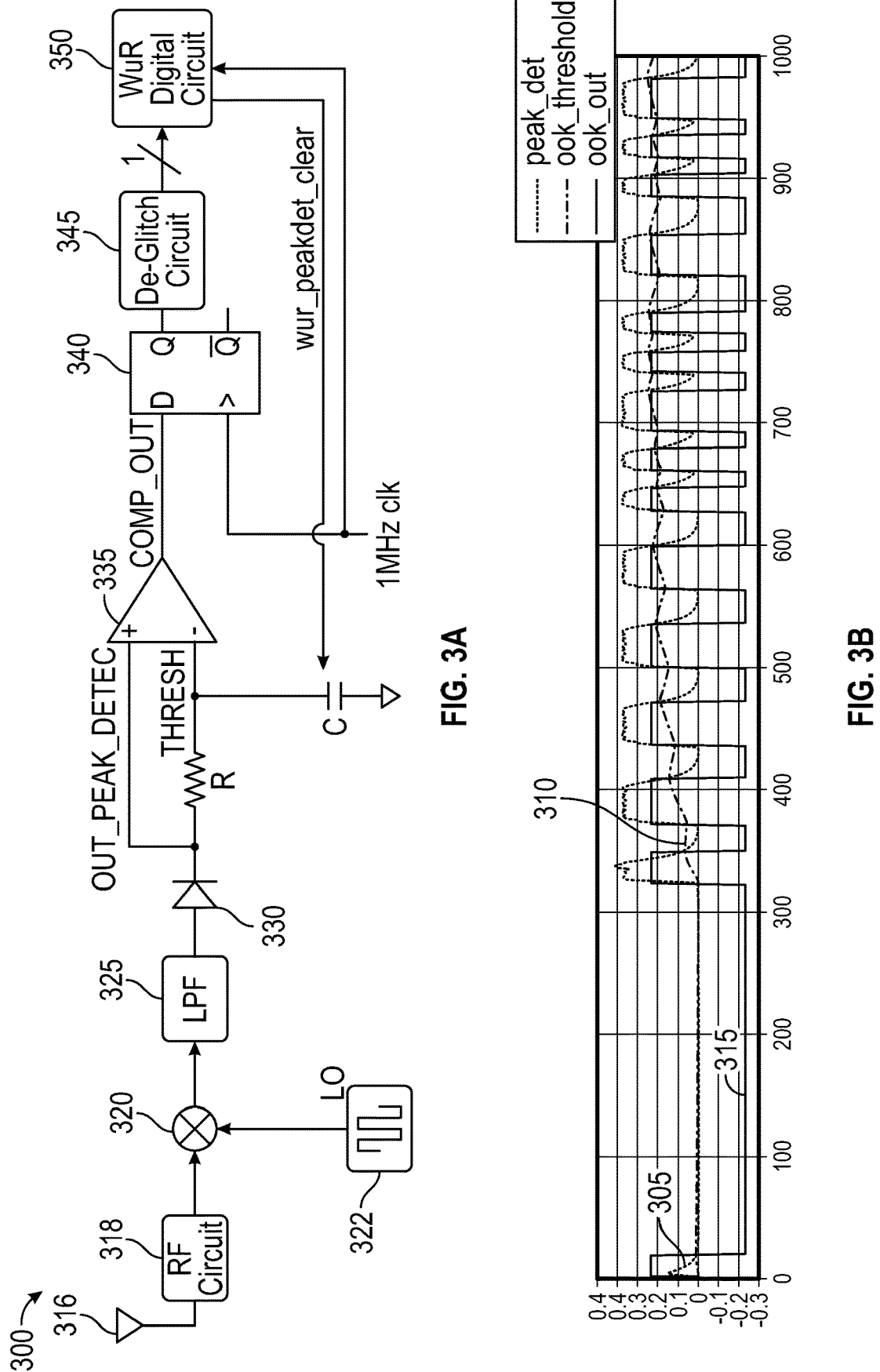
FIG. 3A is a block diagram of a portion of a wake-up receiver in accordance with an embodiment.
FIG. 3B is a timing diagram illustrating various signals relevant to the wake-up radio of FIG. 3A.

Referring now to FIG. 3A, shown is a block diagram of a portion of a wake-up receiver in accordance with an embodiment. As shown in FIG. 3, a receiver 300 may be implemented as part of a multi-mode receiver such as receiver 120 of FIG. 1. As shown, incoming radio frequency (RF) signals are received via an antenna 316 and are provided to a RF circuit 318. In various embodiments, RF circuit 318 may be configured to perform various processing on the received RF signal such as amplification in a low noise amplifier (LNA), filtering in one or more filters and so forth.

The resulting RF signals are provided to a mixer 320, which downconverts the RF signals to lower frequencies signals, e.g., zero intermediate frequency (ZIF). To this end, mixer 320 downconverts the received RF signals using a mixing signal received from a local oscillator 322. Resulting downconverted signals are passed though a low pass filter (LPF) 325 and are provided to a peak detector 330 that outputs a peak signal (OUT_PEAK_DETECT). As shown, the peak signal is provided to a positive input of a comparator 335. In turn, the peak signal is further filtered in an RC filter formed of a resistor R and a parallel-coupled capacitor C that results in a threshold signal that is provided to a negative input of comparator 335.

The resulting comparison signal (COMP_OUT) is provided to a D-type flip-flop 340 that is clocked with a 1 megahertz (MHZ) clock signal. In turn, the output of flip-flop 340 is provided to a de-glitch circuit 345, which generates a 1-bit digital signal that is output to a digital portion of the wake-up radio (WuR digital circuit 350).

As will be further described below, digital circuit 350 is configured to process this incoming bit stream to detect the presence of a valid wake-up packet. Upon such detection, digital circuit 350 outputs an interrupt signal or other notification, which may be sent to an energy management unit and/or a main radio circuit. As further shown, digital circuit 350 may generate a clear signal (wur_peakdata_clear) to cause the threshold signal to be cleared, by discharging capacitor C. This is so, as the threshold may undesirably increase, e.g., in the presence of a high-power blocker (such as a Wi-Fi blocker signal). Thus this signal causes a reset of the threshold signal in the case of an undesired increase in the threshold due to such blocker. Understand while shown at this high level in the embodiment of FIG. 3A, many variations and alternatives are possible.

Referring now to FIG. 3B, shown is a timing diagram illustrating various signals relevant to the wake-up radio of FIG. 3A. In an embodiment, an incoming RF signal 305 has MOOK modulation. With this Manchester-based encoding, amplitude information is recovered via a peak detector (such as peak detector 330 of FIG. 3A). A resulting peak signal 305 is compared to a threshold 315. As shown, threshold 315, which is based on peak signal 305, varies (according to the RC filter characteristics). The resulting comparison output is thus a single bit sample at the clock rate of the clock that drives a flip-flop (such as flip-flop 340). A clock signal of 1 MHz results in an oversampling of 8. This 1-bit signal stream is thus the input to digital circuit 350. Digital circuit 350 may perform a timing acquisition based on this signal.

Figure 3C:
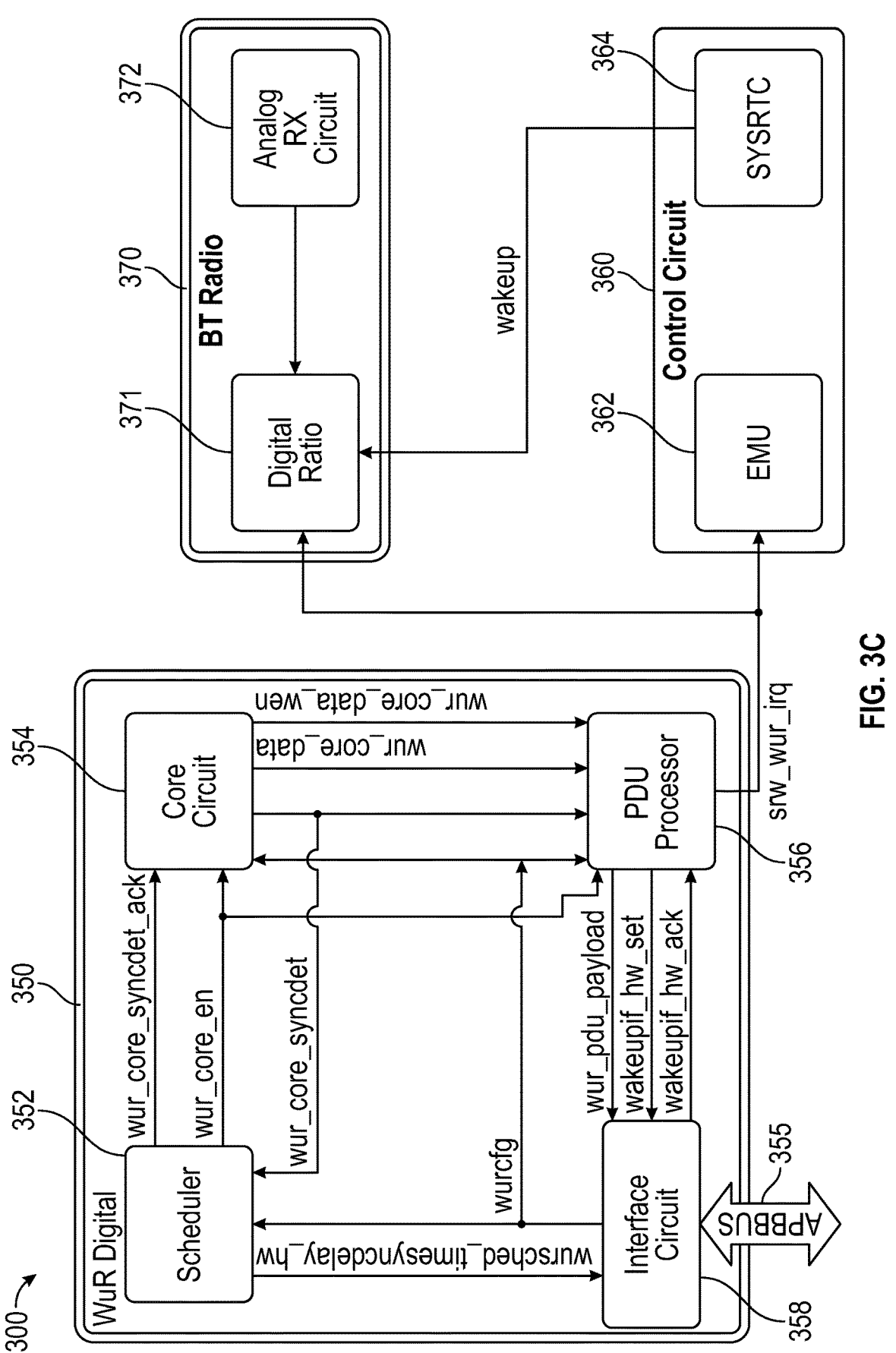
FIG. 3C is a block diagram of a multi-radio arrangement in accordance with an embodiment.

Referring now to FIG. 3C, shown is a block diagram of a multi-radio arrangement in accordance with an embodiment. In FIG. 3C, radio 300 is shown primarily with receive components (although it is to be understood that transmit components also may be present), and includes circuitry both for a wake-up radio in accordance with an embodiment as well as a main radio, such as a Bluetooth radio.

As illustrated with regard to WuR digital circuit 350, multiple constituent components are included. A scheduler 352 controls scheduling of operations within the digital circuitry, and couples to a core circuit 354 and an interface circuit 358 (which may include a plurality of registers and a bus interface). As shown, circuit 358 couples to a bus 355, which may be in communication with a host processor. In an embodiment, bus 355 may be implemented as an Advanced Peripheral Bus (APB).

In an embodiment, scheduler 352 may include programmable hardware circuitry and may be implemented at least in part with a finite state machine that is configured to enable core circuit 354 for a scan window according to a predetermined interval. As one example, this interval may be a programmable value. At each interval, core circuit 354 and other circuitry can be enabled to scan for an incoming wake-up request for a given duration.

Scheduler 352 may enable operation of core 354 via an enable signal (wur_core_en). In addition, scheduler 352 sends an acknowledge signal (wur_core_syncdet_ack) to core 354. As will be described below, this acknowledge signal may be sent in response to an indication by core 354 of detection of a sync word of a wake-up packet. As further illustrated, scheduler 352 may send a signal (wursched_timesyncdelay_hw) to interface circuit 358, which includes a write enable bit and a write data field, such that this signal includes information regarding the time at which a sync word is found in a time sync mode.

In response to enabling by scheduler 352, core 354 may operate to perform a packet timing acquisition based on an incoming bit stream (namely an MOOK-modulated bit stream). Core 354 further operates to capture incoming data timing acquisition. Further details of such operation are described below. As further illustrated, when a sync word is validly detected in core 354, it issues a detection signal (wur_core_syncdet) both to scheduler 352 and to a PDU processor 356. Core 354 also sends a write enable signal (wur_core_data_wen) to PDU processor 356. This signal may be sent in conjunction with decoded and demodulated data (wur_core_data) output from core 354.

PDU processor 356 may be configured to process incoming data bits of a data packet to determine whether a valid wake-up event has been received. Such operations include performing a CRC check on the incoming data to ensure that a given packet was correctly received in response to detection of a wake-up packet. In an embodiment, PDU processor 356 processes the message if the following conditions are met: WM and Length fields are valid options; the Address matches the wake-up radio's configured address and/or a valid broadcast address; Token matches one of the wake-up radio's configured tokens; and CRC passes.

In accordance with an embodiment, PDU processor 356 sends an interrupt signal to additional circuitry of radio 300.

More specifically as shown, this interrupt signal (srw_wur_irq) is sent to an energy management unit (EMU) circuit 362 of a control circuit 360 and is also sent to a digital radio circuit 374 of a Bluetooth radio 370.

Thus when a valid wake-up packet is received, receive operations may be initiated within radio 370 as further controlled in response to receipt of a wake-up signal from a system real time clock circuit 364.

As further illustrated, PDU processor 356 sends a payload of a wake-up packet to interface circuit 358, which can send it, in turn, to a host processor for handling. Also PDU processor 356 sends a set signal (wake-upif_hw_set), which causes interface circuit 358 to set a register. In response, interface circuit 358 sends an acknowledgement signal (wake-upif_hw_ack) back to PDU processor 356.

Still with reference to FIG. 3C, Bluetooth radio 370 includes, in addition to digital radio circuit 374, an analog receiver 372. Analog receiver 372 may be configured to receive an incoming RF signal (e.g., a BLE communication) which it processes in an analog front end to amplify, filter, downconvert, and convert the downconverted signal to a digital signal for sending to digital radio circuit 374.

Figure 4:
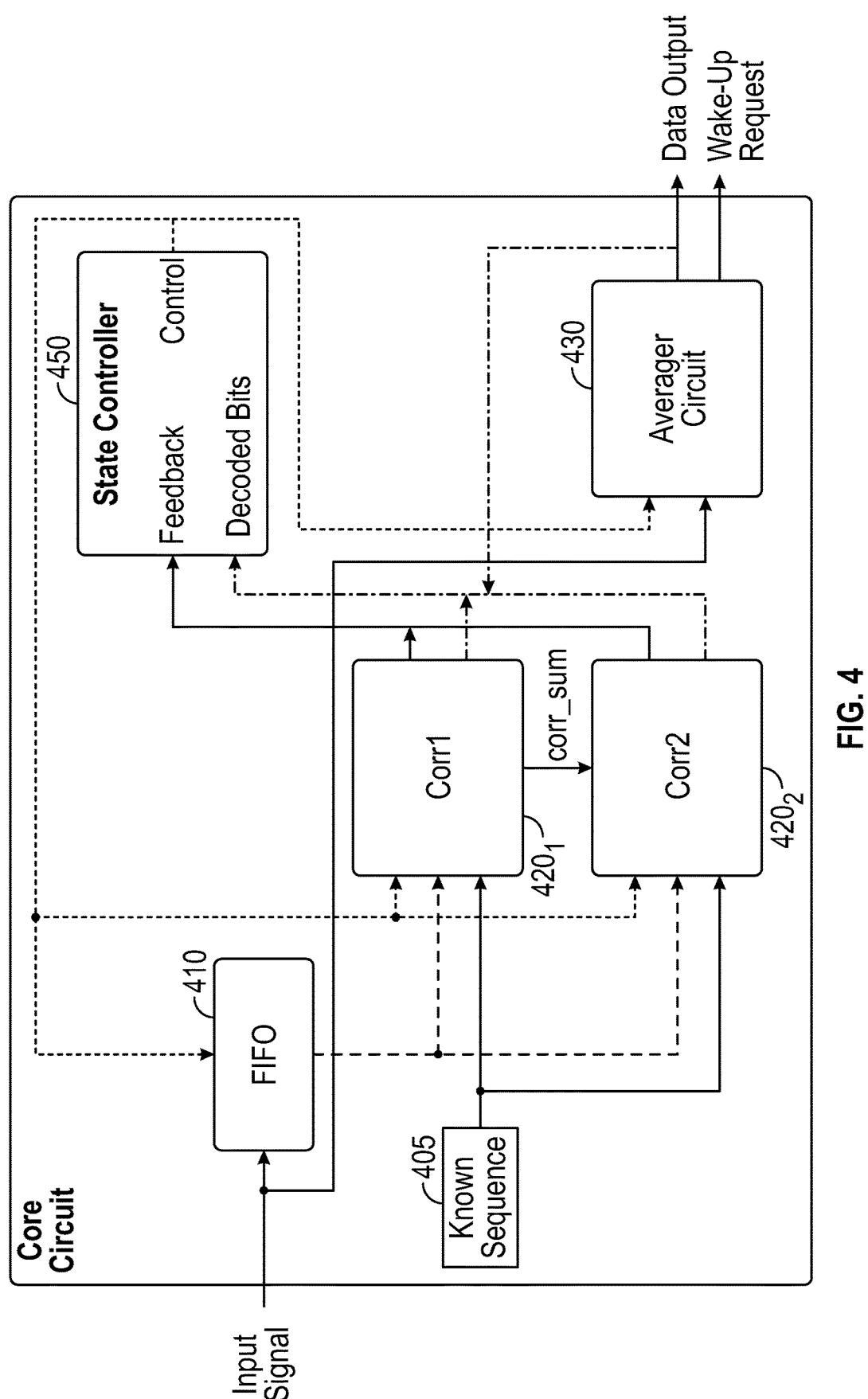
FIG. 4 is a block diagram of a core circuit in accordance with an embodiment.

Referring now to FIG. 4, shown is a block diagram of a core circuit in accordance with an embodiment. Core circuit 400 is an implementation of core circuit 352 of FIG. 3C. As shown, an incoming bit stream is received and stored into a buffer 410, implemented as a first in first out (FIFO) buffer. Under control of a state controller 450, details of which are discussed further below, the bit stream is output from buffer 410 to a first correlator $420_1$ and a second correlator $420_2$ (when enabled).

In embodiments herein, correlators 420 may be configured as single-bit correlators. As will be described, with an oversampled bit stream (e.g., 8× oversampling), correlators 420 may be configured to perform correlations on 8 bits at a time (corresponding to a single-bit MOOK-modulated data). In an embodiment, correlators 420 each may be configured to perform 128-sample single-bit correlations that are used for timing acquisition, as well as for performing sync word decoding after timing is acquired. By use of single-bit correlators, power consumption may be substantially reduced.

Specifically correlators 420 are configured to perform a correlation between the incoming bit stream and a known sequence stored in a sequence register 405. In embodiments herein, this known sequence may be at least a portion of a sync word of a wake-up packet. In one particular embodiment, this sync word may have a value of 0x8E89BED6. At a high level, a two-step single bit correlation detection is performed on at least a portion of sync word. In a particular embodiment, a 256 sample, single bit correlation is performed to find fine timing, where first correlator $420_1$ operates first and then second correlator $420_2$ operates, such that together they act as a 256-sample correlator.

State controller 450 may maintain track of each processing stage within core circuit 400. In addition, state controller 450 may control correlators 420 and an averager circuit 430 for particular task durations and operating modes. In operation under control of state controller 450, in a first state, first correlator $420_1$ is enabled. In first correlator $420_1$, when a value of a correlation result exceeds a threshold level, it sends a feedback signal to state controller 450. In response to this feedback signal, state controller 450 enables second correlator $420_2$, which similarly performs a correlation on another portion of the sync word. More specifically, first correlator $420_1$ operates on 128 bits to detect the first 8 bits of a sync word (with 8× oversampling and Manchester encoding, these 8 sync word bits corresponds to 128 bits of the incoming bitstream). As shown, correlator $420_1$ also provides its correlation result to second correlator $420_2$, which in turn generates a correlation sum from this first correlation result and a second correlation result calculated in second correlator $420_2$.

When this correlation sum exceeds another (higher) threshold level, state controller 450 enables averager circuit 430. In an embodiment, averager circuit 430 may be configured to decode incoming samples into data bits. In operation, averager circuit 430 may perform an averaging function on incoming bits of the bit stream to generate an output data stream corresponding to a received packet. When a wake-up packet is received, averager circuit 430 generates a wake-up request, which it sends to a PDU processor. Understand while shown at this high level in the embodiment of FIG. 4, many variations and alternatives are possible.

Figure 5A:
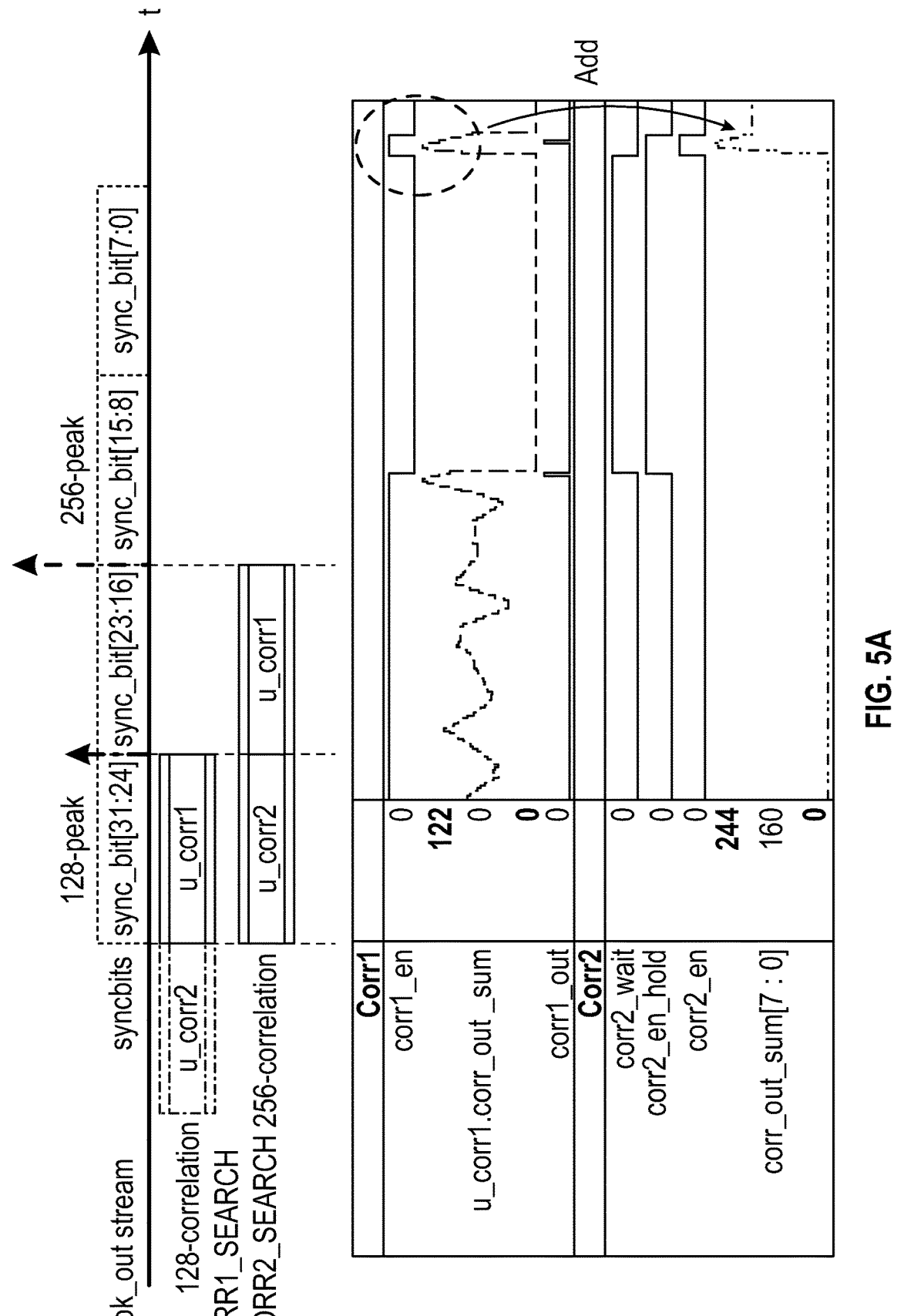
FIG. 5A is a timing diagram illustrating a two-step single-bit correlation detection operation in accordance with an embodiment.

Referring now to FIG. 5A, shown is a timing diagram illustrating a two-step single-bit correlation detection operation in accordance with an embodiment. As shown in FIG. 5A, an incoming bit stream (ook_out stream) is provided to a first correlator, which is enabled (corr1_en). As shown, a correlation operation is performed on the eight most significant bits (MSBs) of a sync word (sync_bits[31:24]). During this first correlator operation a positive result is returned when a correlation result for this incoming bit stream exceeds a threshold level (shown in the graphical illustration when the correlation result exceeds a threshold). When this occurs, the second correlator also is enabled and performs a correlation on another portion of the incoming sync word (namely, sync_bits[23:16]).

In turn, these correlation results are summed. When it is determined that the sum exceeds a second threshold, timing is acquired. At this point, an averager circuit is enabled to decode remaining samples of the incoming bit stream (including sync_bits[15:0]). In addition, note that the correlators remain enabled to perform a sync check by performing correlations again on the already arrived bits to confirm valid detection. Note that this sync check operation is a fast sync check, which is performed on the already arrived bits and in which the correlators operate as if processing a new incoming sequence. At the same time, the averager circuit is enabled to perform a slow sync check to check the arriving bits (sync_bits[15:0]).

Figure 5B:
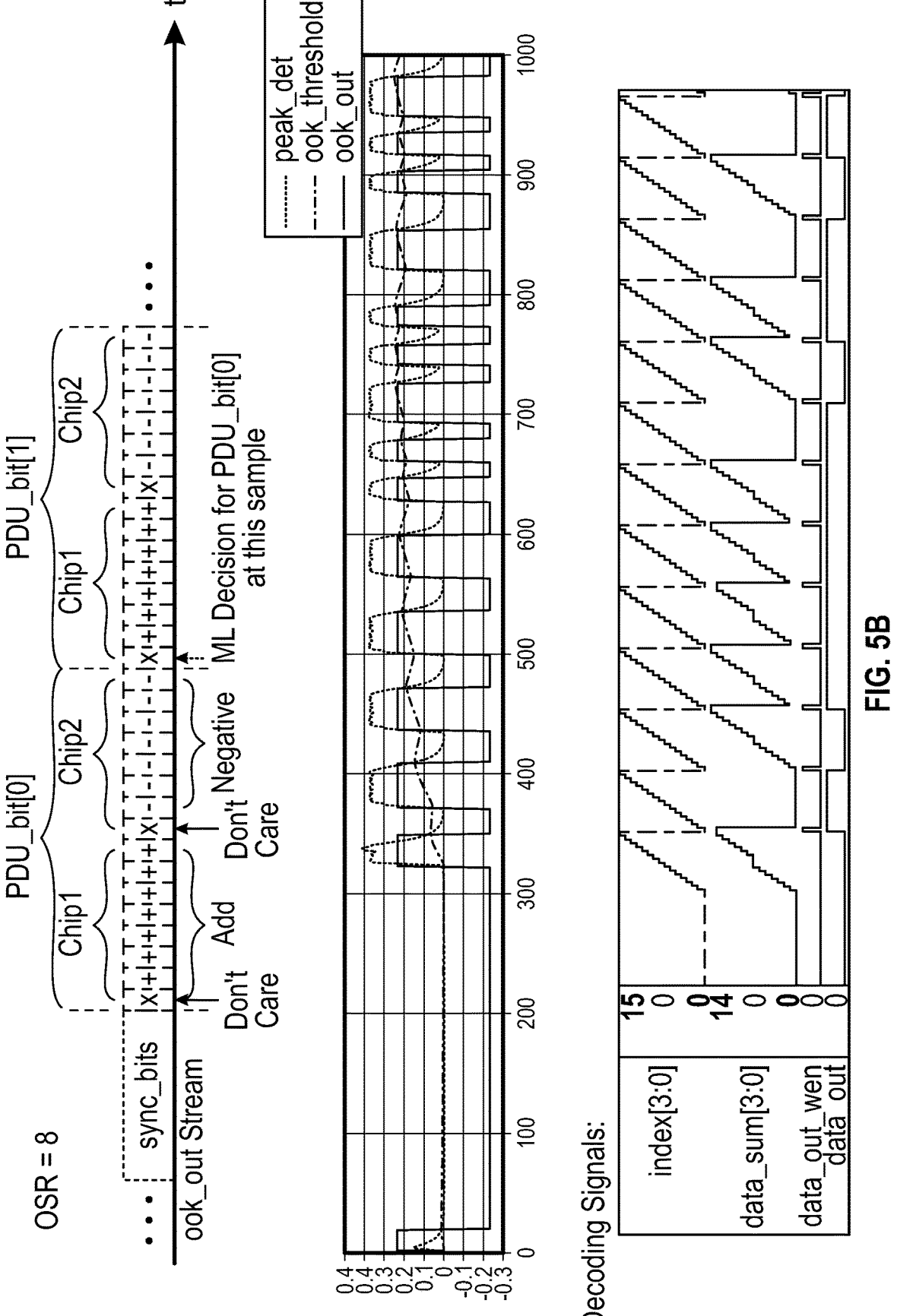
FIG. 5B are timing diagrams illustrating operation of an averager circuit in accordance with an embodiment.

Referring now to FIG. 5B, shown are timing diagrams illustrating operation of an averager circuit in accordance with an embodiment. As illustrated, the averager circuit receives incoming oversampled bits of the bit stream (ook_out stream). With 8× oversampling and Manchester encoding of the OOK data stream, there are two chips per bit, with each chip being formed of 8 bits. Note that the averager circuit operates by discarding the first bit of each chip (as a don't care). Thus, the averager circuit operates to add the relevant bits of the two chips to output a single-bit value of the data stream. With the Manchester encoding, a logic one value of the first bit (PDU_bit[0]) results from positive values for the first chip and negative values for the second chip. At a conclusion of the two chips, a maximum likelihood (ML) decision may be made during the first sample of the first chip of a next incoming bit of the data packet. Although shown at this high level in the embodiment of FIG. 5B, many variations and alternatives are possible.

Figures 6A, 6B:
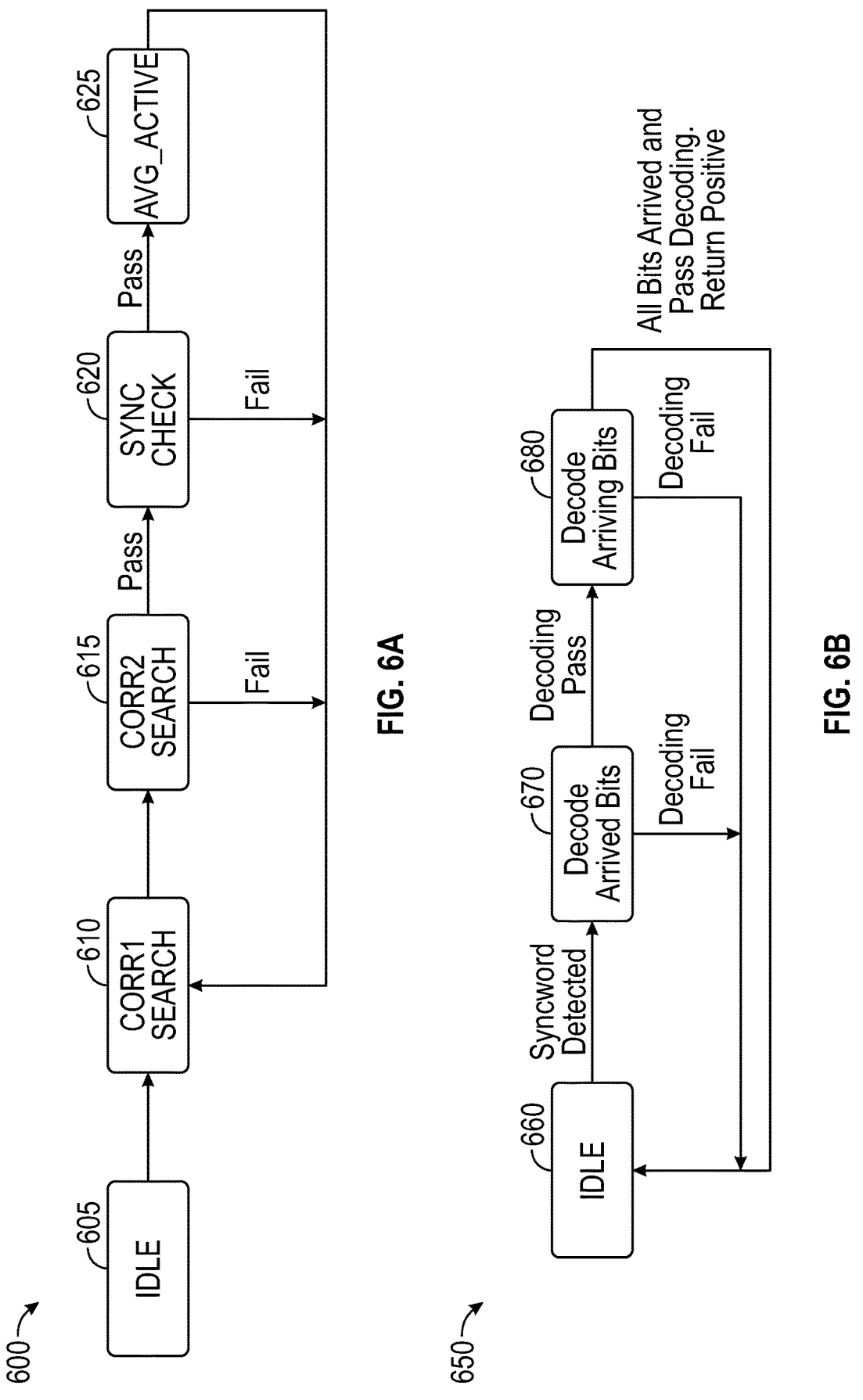
FIG. 6A is a flow diagram of a method for operating a state controller in accordance with an embodiment.
FIG. 6B is a flow diagram of a method for operating a state controller in accordance with another embodiment.

Referring now to FIG. 6A, shown is a flow diagram of a method for operating a state controller in accordance with an embodiment. More specifically as shown in FIG. 6A, method 600 is a method for controlling a timing acquisition process performed in a core circuit. In one or more embodiments, method 600 may be performed by a state machine of the state controller such as a core finite state machine (FSM). As illustrated, method 600 begins in an idle state (state 605) in which circuitry of the core circuit is in an idle state. Control passes to state 610 when an incoming packet begins to be received. At state 610, a first correlator search process is enabled. As discussed above, this first correlator may be configured to perform correlations between a first portion of a sync word (e.g., MSBs of the sync word) and a known pattern.

When the correlation result exceeds a threshold, control passes to state 615 where a second correlator search process may be enabled. In state 615, this second correlator may be configured to perform correlations between a second portion of the sync word (e.g., lesser MSBs of the sync word) and a known pattern. If the second correlator does not generate a correlation result (the sum of the 2 correlations) that exceeds the second threshold, the correlation at state 615 fails, and control passes back to block 610 for further searching for a sync word portion within the incoming bit stream in the first correlator.

Still with reference to FIG. 6A, instead if the second correlator succeeds in finding another sync word portion (when a sum of the correlation result to the two correlation results exceeds a second threshold), control passes to state 620 in which a sync check (both fast and slow sync checks) is performed. As discussed above, this sync check may be performed on the already arrived bits in the two correlators. At this time, the averager circuit is configured to perform a slow sync check on arriving bits of the sync word (e.g., the 16 LSBs). Should this operation fail, control passes back to state 610.

Otherwise, when the sync check passes such that a valid sync word is identified, control passes to state 625. At state 625, the averager circuit is controlled to perform averaging of Manchester encoded bits of the bit stream as discussed above to decode incoming bits, including the various fields of the wake-up packet. Note that at this point after the sync check completes at state 620, the correlators may be placed into an idle state to reduce power consumption.

Referring now to FIG. 6B, is a flow diagram of a method for operating a state controller in accordance with another embodiment. More specifically as shown in FIG. 6B, method 650 is a method for controlling a sync check process performed in a core circuit. In one or more embodiments, method 650 may be performed by a state machine of the state controller such as a core FSM.

As illustrated, method 650 begins at an idle state 660. This idle state remains in effect until a sync word is detected (based upon the sum result of the first and second correlators). When the sync word is detected, control passes to state 670 in which the already arrived bits are decoded in the correlators, which remain active. Note that if decoding fails for this fast sync word check, control passes back to idle state 660.

Still referring to FIG. 6B, when it is determined that the decoding passes and that the MSBs of the sync word are correctly received, control passes to state 680 in which arriving (incoming) bits are decoded. As discussed above, such decoding may be performed in the averager circuit which receives the bits and decodes the arriving bits to identify the LSBs of the sync word. Should this operation fail, control passes back to idle state 660. Note that when the full sync word has been validly received, the state controller sends a control signal to continue to enable the averager circuit to decode while instructing the FIFO to feed incoming signals to it. Still with reference to FIG. 6B, control passes back to idle state 660. Understand while shown at this high level in the embodiment of FIG. 6B, many variations and alternatives are possible.

Figure 7:
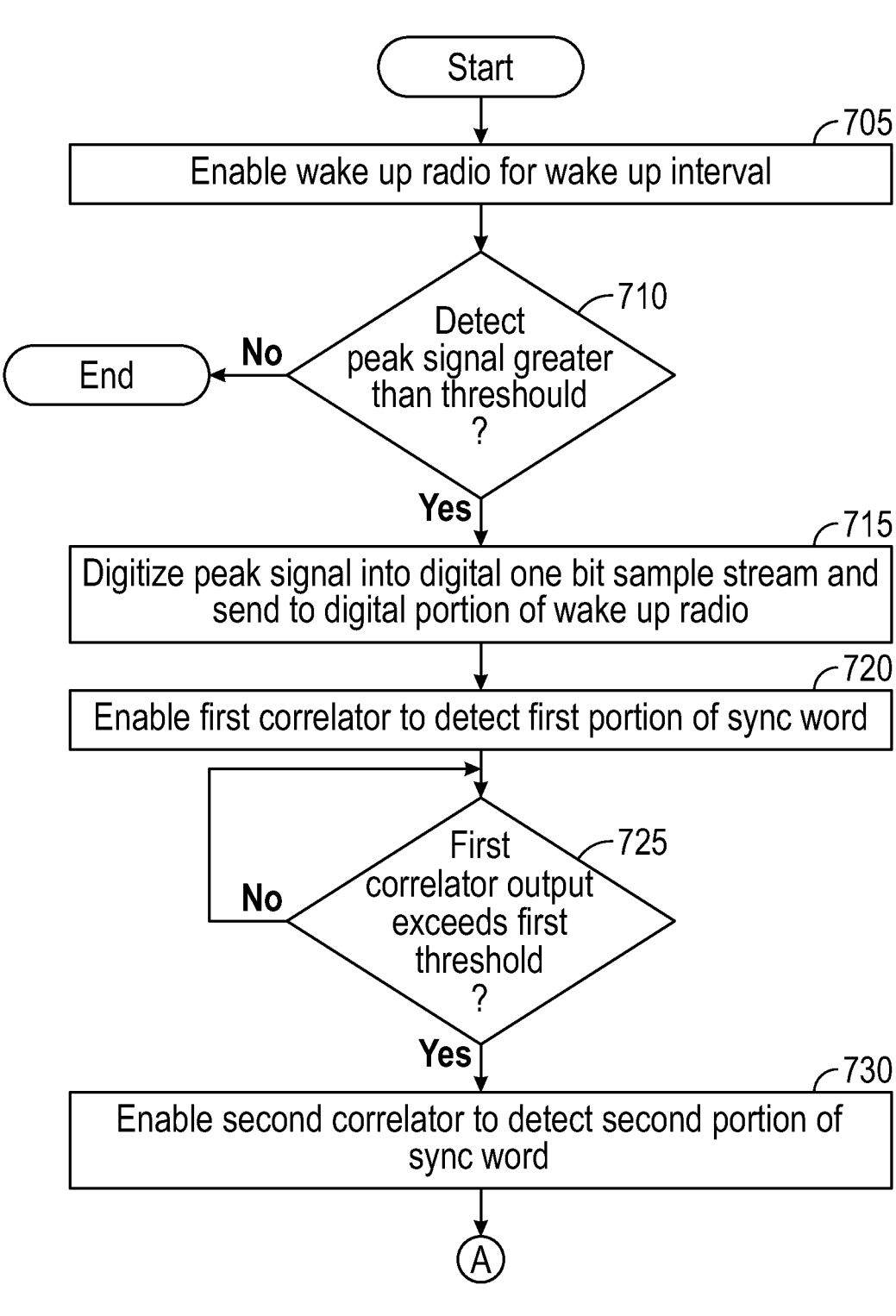
FIG. 7 is a flow diagram of a method in accordance with another embodiment.
Figure 7:
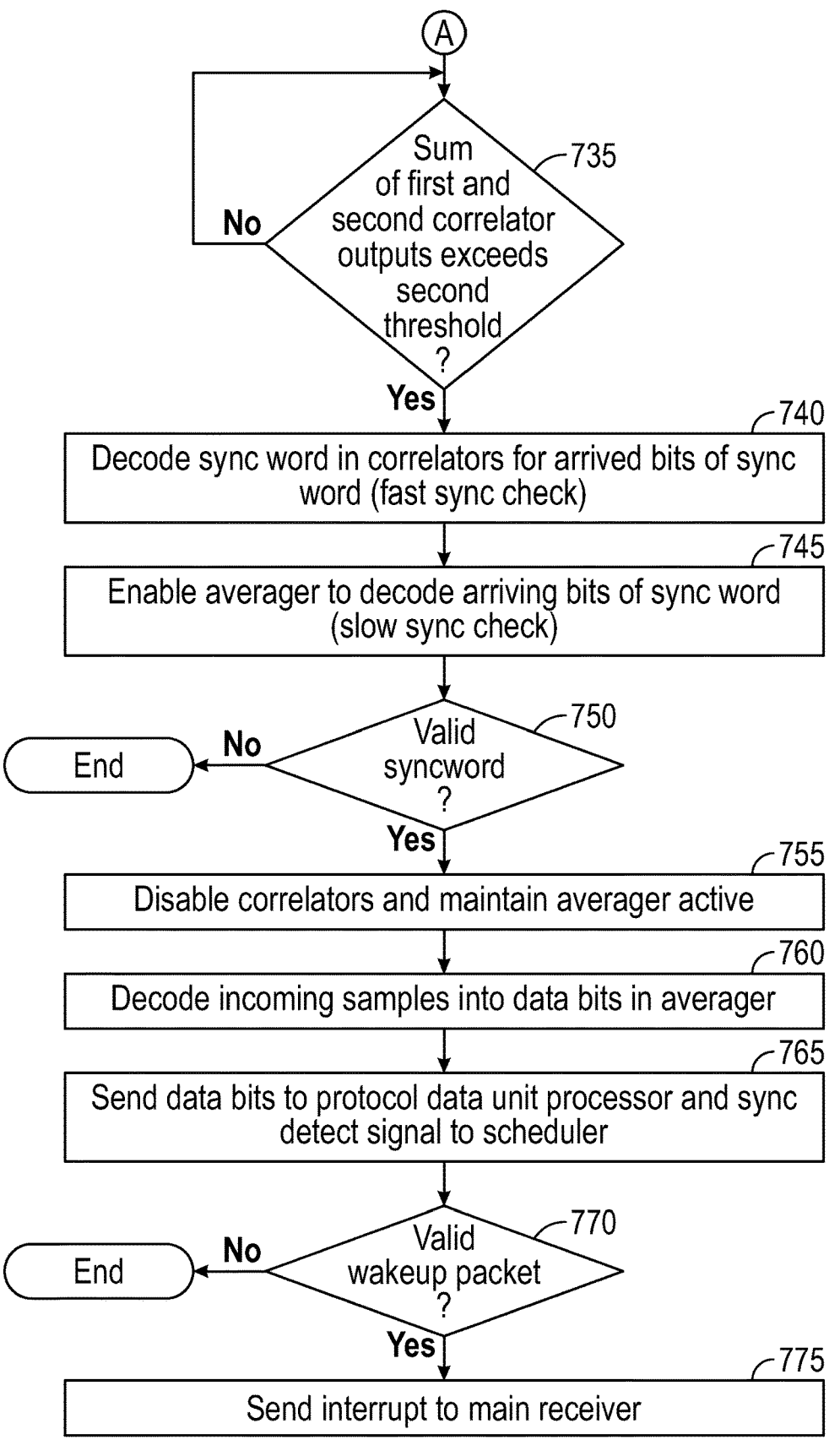

Referring now to FIG. 7, shown is a flow diagram of a method in accordance with another embodiment. More specifically, method 700 is a method for scheduling operations within a wake-up receiver in accordance with an embodiment. In one or more embodiments, at least portions of method 700 may be performed in a scheduler and/or one or more state controllers of the wake-up receiver, along with additional circuitry of the wake-up receiver, such as discussed above, and/or in combination with firmware and/or software.

As illustrated, method 700 begins by enabling the wake-up radio for a wake-up interval (block 705). Although embodiments are not limited in this regard, an example wake-up interval may be between approximately 0 and 131 seconds. Next it is determined at diamond 710 whether a peak signal greater than a threshold level is detected during this wake-up interval. If not, no further operation occurs until another wake-up interval.

Still with reference to FIG. 7, if such peak signal is detected, control passes to block 715 where the peak signal is digitized into a digital 1-bit sample stream. This digitization may be performed in an ADC of the wake-up radio signal processing path. This digital sample stream is thereafter sent to a digital portion of the wake-up radio. Then at block 720, a state controller enables a first correlator to detect a first portion of a sync word. As an example, this first sync word portion may be a set number of MSBs of the sync word (e.g., the 8 MSBs). During this first correlator operation, it may be determined at diamond 725 whether the first correlator output (namely a first correlation result) exceeds a first threshold. If so, control passes to block 730 where the state controller enables a second correlator to detect a second portion of the sync word. As an example, this second sync word portion may be a next number of MSBs of the sync word (e.g., the next 8 MSBs).

Still referring to FIG. 7, next it is determined at diamond 735 whether the sum of the first and second correlator results exceeds a second threshold. If so, control passes to block 740 where the sync word is decoded in the correlators. More specifically, the already arrived bits (e.g., the 16 MSBs of the sync word) may be decoded by way of a fast sync word check in the correlators.

In addition, at block 745, the scheduler enables an averager to decode arriving bits of the sync word. This operation is thus a slow sync check, which may be performed on LSBs of the sync word (e.g., the 16 LSBs).

Still referring to FIG. 7, based on these sync checks, it may be determined whether a valid sync word has been received (diamond 750). If not, no further operations occurs and the wake-up receiver may be placed in an idle state until a next wake-up interval occurs.

Instead when a valid sync word is detected, control passes to block 755 where the correlators are disabled and the averager is maintained active. In this averager, incoming samples may be decoded into data bits (block 760). These data bits then may be sent to a PDU processor (block 765). In addition, a sync detect signal is sent to the scheduler. Based upon the processing in the PDU processor, it is next determined at diamond 770 whether a valid wake-up packet has been received. If so, an interrupt is sent to a main receiver, e.g., a main Bluetooth receiver, to enable it to become active to process an incoming message intended for the receiver (block 775). Otherwise the wake-up signal is not sent, and no further operations occur for this incoming bitstream. Understand while shown at this high level in the embodiment of FIG. 7, many variations and alternatives are possible.

Figure 8A:
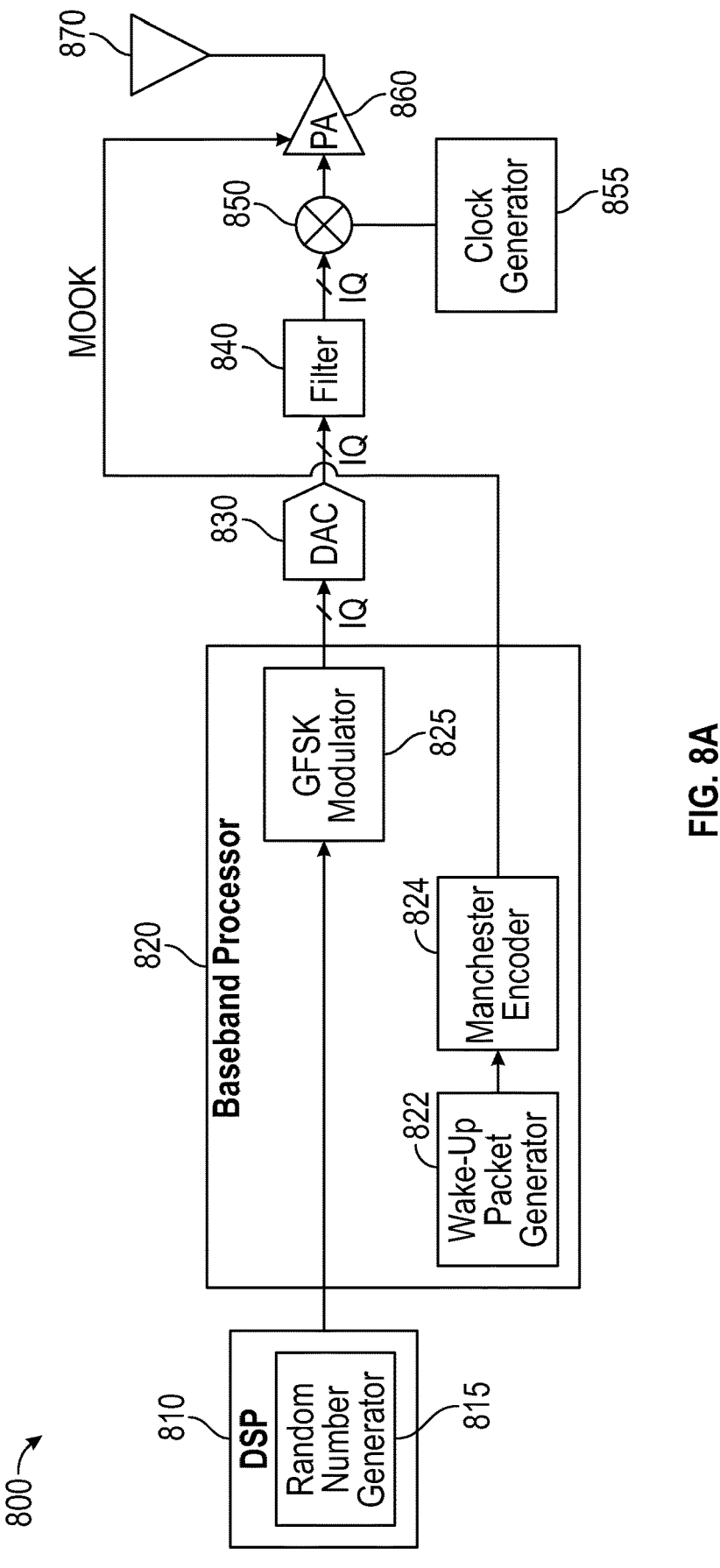
FIG. 8A is a block diagram of a transmitter in accordance with an embodiment.

Referring now to FIG. 8A, shown is a block diagram of a transmitter in accordance with an embodiment. More specifically as shown in FIG. 8A, a transmitter 800, which may be implemented as part of transceiver circuitry of an IoT or other integrated circuit, includes a digital signal processor (DSP) 810. In other cases, transmitter 800 may be a standalone transmitter.

In any event, DSP 810 may process information to be communicated in a wake-up transmission. As shown, DSP 810 includes a random number generator 815 to generate random data, e.g., PRBS9 data. In turn, this random data is provided to a baseband processor 820. Baseband processor 820 includes a wake-up packet generator 822, which may generate a given wake-up packet, e.g., as shown in FIG. 2A above. To this end, packet generator 822 may access information stored in a memory structure, such as registers, random access memory or so forth, to obtain values for the various fields of the wake-up packet. In different implementations, this information may be obtained from a non-volatile storage, e.g., as part of firmware that is loaded into transmitter 800 during initialization.

In turn, this wake-up packet is Manchester encoded in a Manchester encoder 824, such that each bit is coded with two chips, as discussed, resulting in MOOK data. As further shown, the incoming random data is provided to a GFSK modulator 825, which modulates the incoming random data, resulting in a BLE carrier signal.

Baseband processor 820 outputs this BLE carrier signal and the MOOK data. The BLE carrier signal is provided to a digital-to-analog converter (DAC) 830 for conversion to analog form. This signal may be filtered in a filter 840. Thereafter the signal may be upconverted to an RF level via a mixer 850, which receives a mixing signal from a clock generator 855. Then the RF signal may be amplified in a power amplifier 860. As shown, PA 860 modulates the amplitude of the RF signal using the MOOK signal, and the resulting amplified RF signal is transmitted via an antenna 870. Stated another way, the RF version of the BLE carrier signal is amplitude modulated with Manchester encoding based on the contents of the wake-up packet. Understand while shown at this high level in the embodiment of FIG. 8A, many variations and alternatives are possible.

Figure 8B:
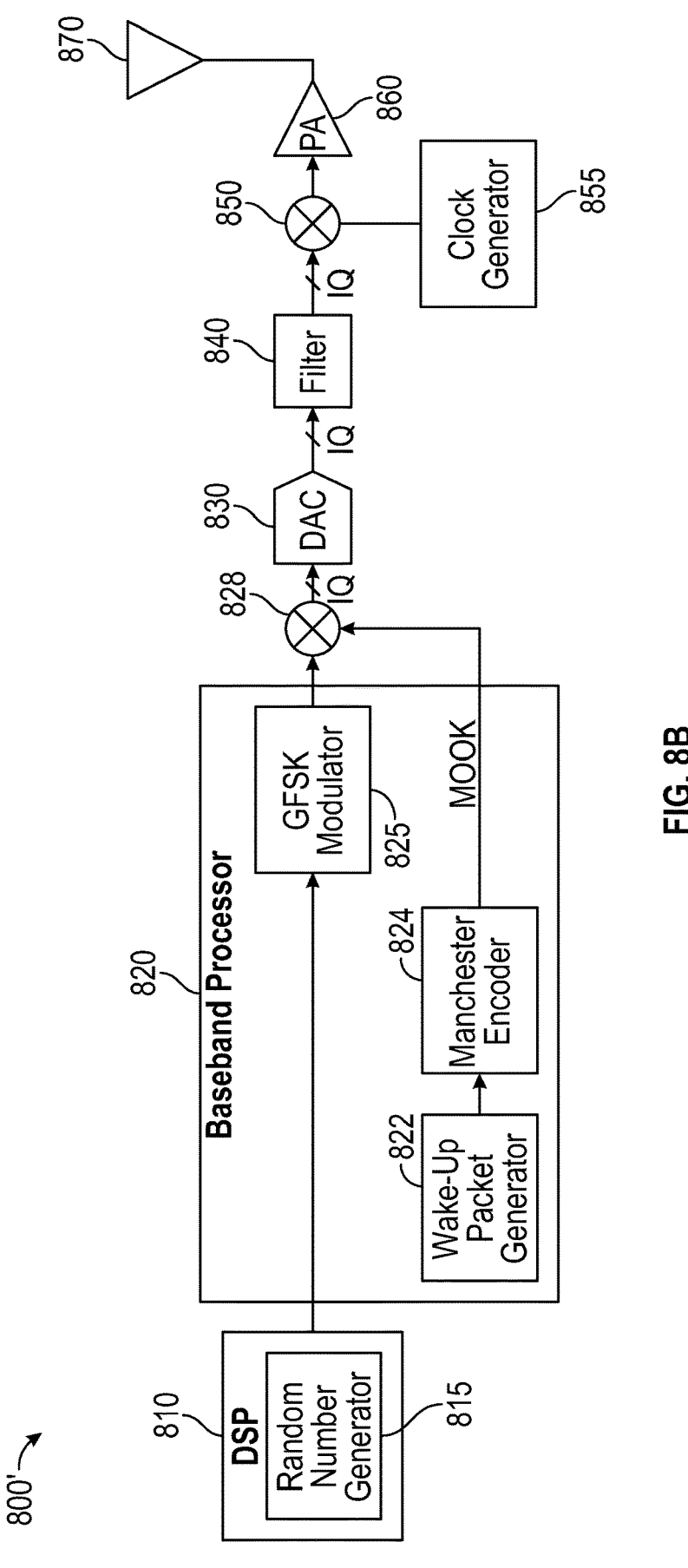
FIG. 8B is a block diagram of a transmitter in accordance with another embodiment.

For example, as shown in FIG. 8B, which is a block diagram of a transmitter in accordance with another embodiment, transmitter 800' includes a complex multiplier 828 coupled to an output of baseband processor 820. Complex multiplier 828 is configured to apply MOOK modulation on top of the baseband IQ complex signal (the BLE carrier signal). In other aspects, transmitter 800' operates the same as transmitter 800 of FIG. 8A.

Understand that WuRs in accordance with embodiments can be used in a wide variety of devices, to enable reduced power consumption, particularly for battery-powered devices that are intended for long term use. Although embodiments are not limited to the following examples, WuRs can be incorporated into a variety of devices such as IoT devices including asset tags, electronic shelf labels, actuators such as door locks, window blinds and so forth, insulin pumps, sensors, among many others.

While the present disclosure has been described with respect to a limited number of implementations, those skilled in the art, having the benefit of this disclosure, will appreciate numerous modifications and variations there-from. It is intended that the appended claims cover all such modifications and variations.

What is claimed is:

1. An apparatus comprising:
an analog front end circuit to receive a radio frequency (RF) signal and to output a bit stream; and
a digital circuit coupled to the analog front end circuit, the digital circuit comprising:
   a first correlator to receive a first portion of the bit stream and perform a correlation on the first portion to generate a first correlation result;
   a second correlator to receive a second portion of the bit stream and perform a correlation on the second portion to generate a second correlation result; and
   a controller coupled to the first correlator and the second correlator, wherein the controller is to enable the second correlator when the first correlation result exceeds a first threshold.

2. The apparatus of claim 1, wherein:
the first correlator is to perform the correlation on the first portion of the bit stream comprising a first portion of a sync word of a wake-up packet; and
the second correlator is to perform the correlation on the second portion of the bit stream comprising a second portion of the sync word of the wake-up packet.

3. The apparatus of claim 2, wherein the apparatus is to sum the first correlation result and the second correlation result and compare the sum to a second threshold.

4. The apparatus of claim 3, further comprising an aver-ager, wherein the controller is to enable the averager in response to the sum exceeding the second threshold.

5. The apparatus of claim 4, wherein the first and second correlators are to perform a sync word check on arrived bits of the bit stream, and the averager is to perform the sync word check on arriving bits of the bit stream.

6. The apparatus of claim 1, wherein the analog front end circuit is to receive the RF signal having Manchester encod-ing on off keying (MOOK) modulation.

7. The apparatus of claim 1, wherein the first correlator and the second correlator comprise single-bit correlators.

8. The apparatus of claim 1, wherein the controller comprises at least one state controller, wherein the at least one state controller is to:
   in response to an enable signal from a scheduler, cause the first correlator to transition from an idle state to an active state; and
   in response to the first correlation result exceeding the first threshold, cause the second correlator to transition from the idle state to the active state.

9. The apparatus of claim 1, wherein the controller comprises at least one state controller, wherein the at least one state controller is to cause:
   the first correlator and the second correlator to decode arrived bits of a sync word of a wake-up packet; and
   cause an averager to decode arriving bits of the sync word of the wake-up packet.

10. The apparatus of claim 1, further comprising a sched-uler to enable the controller for a scan window according to a predetermined interval, the apparatus comprising a wake-up radio.

11. The apparatus of claim 10, wherein in response to detection of a valid wake-up packet in the bit stream, the wake-up radio is to send a wake-up signal to a second radio to cause the second radio to enter an active state.

12. A method comprising:
receiving, in a first radio, a radio frequency (RF) signal and processing the RF signal to provide a bit stream to a digital circuit of the first radio;
enabling a first correlator of the first radio to detect a first portion of a sync word of a wake-up packet of the bit stream, and thereafter enabling a second correlator of the first radio to detect a second portion of the sync word;
enabling an averager circuit to detect another portion of the sync word; and
in response to detection of the sync word, disabling the first and second correlators and maintaining the aver-ager circuit enabled.

13. The method of claim 12, further comprising decoding, via the averager circuit, at least a portion of the wake-up packet.

14. The method of claim 12, further comprising in response to decoding the wake-up packet, sending an inter-rupt from the first radio to a second radio to cause the second radio to be enabled, the first radio comprising a wake-up radio and the second radio comprising a primary radio.

15. The method of claim 12, further comprising:
correlating, in the first correlator, a first portion of the bit stream with a first predetermined value to detect the first portion of the sync word; and
correlating, in the second correlator, a second portion of the bit stream with a second predetermined value to detect the second portion of the sync word.

16. The method of claim 15, further comprising detecting the first portion of the sync word when a first correlation result of the first correlator exceeds a first correlation thresh-old, wherein the first correlator comprises a single-bit cor-relator and the bit stream comprises a Manchester encoded on-off keying bit stream.

17. The method of claim 16, further comprising detecting the second portion of the sync word when a sum of a second correlation result of the second correlator and the first correlation result of the first correlator exceeds a second correlation threshold, wherein the second correlator com-prises a single-bit correlator.

18. The method of claim 14, further comprising:
performing, via the first and second correlators, a sync check on the first and second portions of the sync word using arrived bits of the bit stream; and
performing, via the averager circuit, the sync check on the another portion of the sync word using incoming bits of the bit stream.

19. A system comprising:
a first radio to receive and process an incoming radio frequency (RF) signal, the first radio comprising:
   a digital circuit to receive a bit stream obtained from the incoming RF signal, the digital circuit comprising:
   a scheduler to enable a core circuit for a scan window according to a predetermined interval;
   the core circuit coupled to the scheduler, the core circuit comprising:
      a first correlator to receive a first portion of the bit stream and perform a correlation on the first portion to identify a first portion of a sync word of a wake-up packet;
      a second correlator to receive a second portion of the bit stream and perform a correlation on the second portion to identify a second portion of the sync word of the wake-up packet, wherein the second correlator is to be enabled when a first correlation result exceeds a first threshold; and an averager circuit to decode another portion of the sync word; and a second radio coupled to the first radio, wherein in response to detection of the wake-up packet, the first radio is to send a wake-up signal to the second radio.

20. The system of claim 19, wherein the first and second correlators comprise single bit correlators the first and second portions of the bit stream are oversampled and Manchester encoded, the incoming RF signal comprising the Manchester encoding of random on-off keying data.

\* \* \* \* \*